United States Patent
Ootsuka et al.

(10) Patent No.: US 8,513,349 B2
(45) Date of Patent: Aug. 20, 2013

(54) BINDER COMPOSITION FOR POSITIVE ELECTRODES

(75) Inventors: Yoshiharu Ootsuka, Chuo-ku (JP);
Hironori Kitaguchi, Chuo-ku (JP);
Nobuyuki Fujihara, Chuo-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 13/338,541

(22) Filed: Dec. 28, 2011

(65) Prior Publication Data

US 2012/0309892 A1 Dec. 6, 2012

(30) Foreign Application Priority Data

Jun. 6, 2011 (JP) ................. 2011-126043

(51) Int. Cl.
*C08L 27/00* (2006.01)

(52) U.S. Cl.
USPC ........... 524/520; 525/244; 525/298; 525/302; 525/308; 525/309; 525/310

(58) Field of Classification Search
USPC ................ 524/520; 525/244, 298, 302, 308, 525/309, 310
See application file for complete search history.

(56) References Cited

U.S. PATENT DOCUMENTS

| | | | | |
|---|---|---|---|---|
| 5,030,667 A | * | 7/1991 | Shimizu et al. | 523/201 |
| 5,707,763 A | * | 1/1998 | Shimizu et al. | 429/217 |
| 2002/0037450 A1 | | 3/2002 | Suzuki et al. | |
| 2002/0168569 A1 | * | 11/2002 | Barriere et al. | 429/217 |
| 2003/0039886 A1 | | 2/2003 | Zhang et al. | |
| 2009/0239147 A1 | | 9/2009 | Itou et al. | |
| 2010/0173196 A1 | | 7/2010 | Itou et al. | |

FOREIGN PATENT DOCUMENTS

| | | |
|---|---|---|
| JP | 2002-42819 | 2/2002 |
| JP | 2002-117834 | 4/2002 |
| JP | 2010-55847 | 3/2010 |
| JP | 2011-3529 | 1/2011 |
| WO | WO 97/27260 A1 | 7/1997 |
| WO | WO 2007/088979 A1 | 8/2007 |

OTHER PUBLICATIONS

U.S. Appl. No. 13/599,288, filed Aug. 30, 2012, Kitaguchi, et al.
Extended European Search Report issued Sep. 4, 2012 in European Patent Application No. 11195979.7.

* cited by examiner

*Primary Examiner* — Ling Choi
*Assistant Examiner* — Wenwen Cai
(74) *Attorney, Agent, or Firm* — Oblon, Spivak, McClelland, Maier & Neustadt, L.L.P.

(57) ABSTRACT

A binder composition for the positive electrode of an electric storage device. The composition contains polymer alloy particles composed of: a polymer (A) having a recurring unit derived from vinylidene fluoride, ethylene tetrafluoride, propylene hexafluoride, or mixtures thereof; a polymer (B) having a recurring unit derived from an unsaturated carboxylic acid ester; and water. The average diameter of the polymer alloy particles is 50 to 400 nm. The polymer alloy particles are synthesized by absorbing a monomer (b) to the polymer (A) and polymerizing the monomer (b) to synthesize the polymer (B). The monomer (b) is an unsaturated carboxylic acid ester, or a mixture of an unsaturated carboxylic acid ester and one or more of the following monomers: an α,β-unsaturated nitrile compound, an unsaturated carboxylic acid, a conjugated diene compound, styrene, α-methylstyrene, p-methylstyrene, vinyltoluene, chlorostyrene, divinylbenzene, a carboxylic vinyl ester, and an acid anhydride of an ethylenically unsaturated dicarboxylic acid.

18 Claims, 2 Drawing Sheets

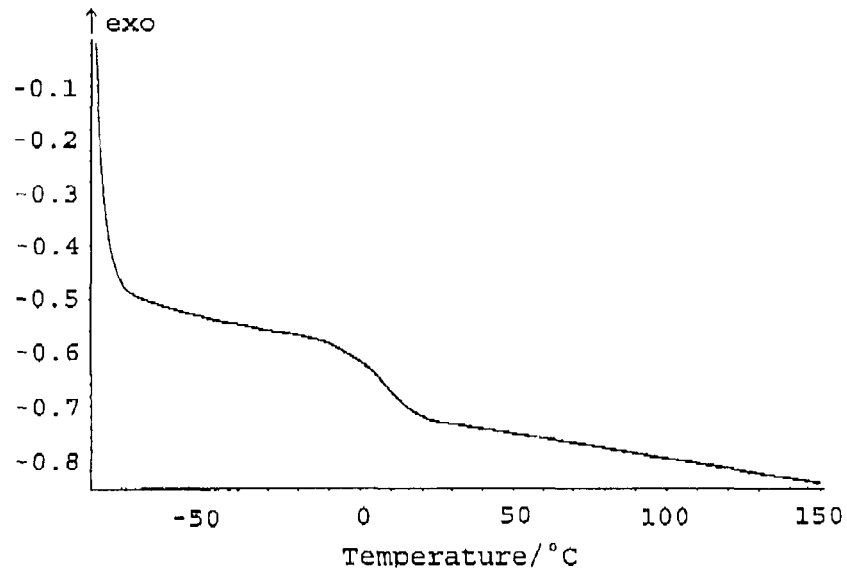
Fig. 1 polymer particles of Example 3 (polymer alloy of polymer A and polymer B)
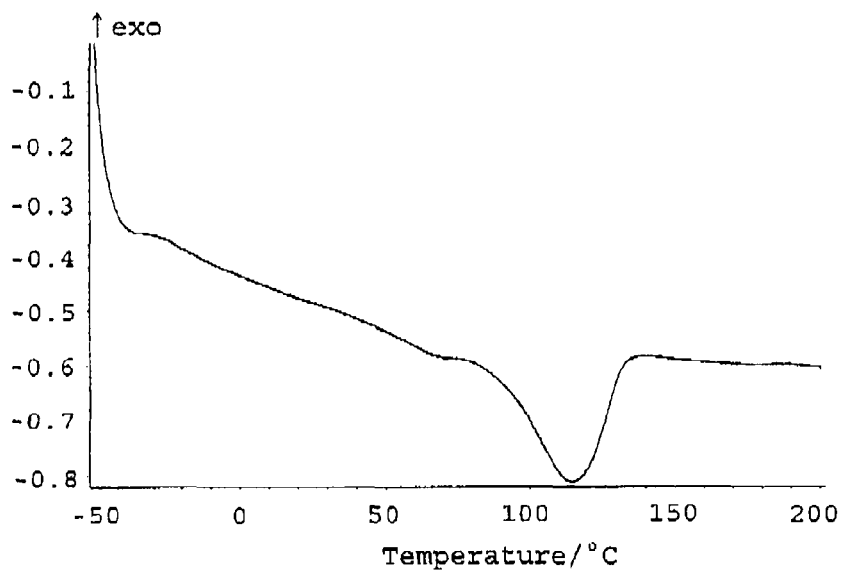
Fig. 2 polymer particles of Comparative Example 4 (polymer A)

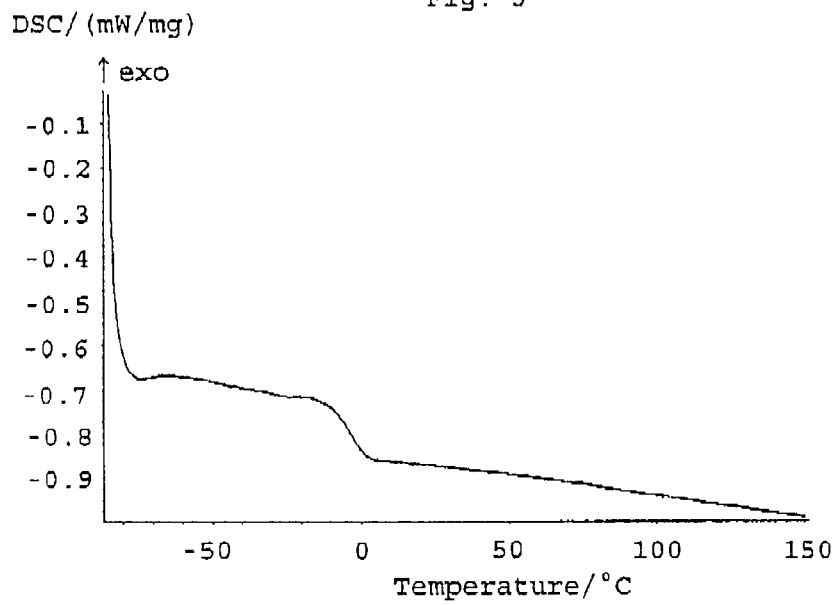
Fig. 3 polymer particles of Comparative Example 5 (polymer B)
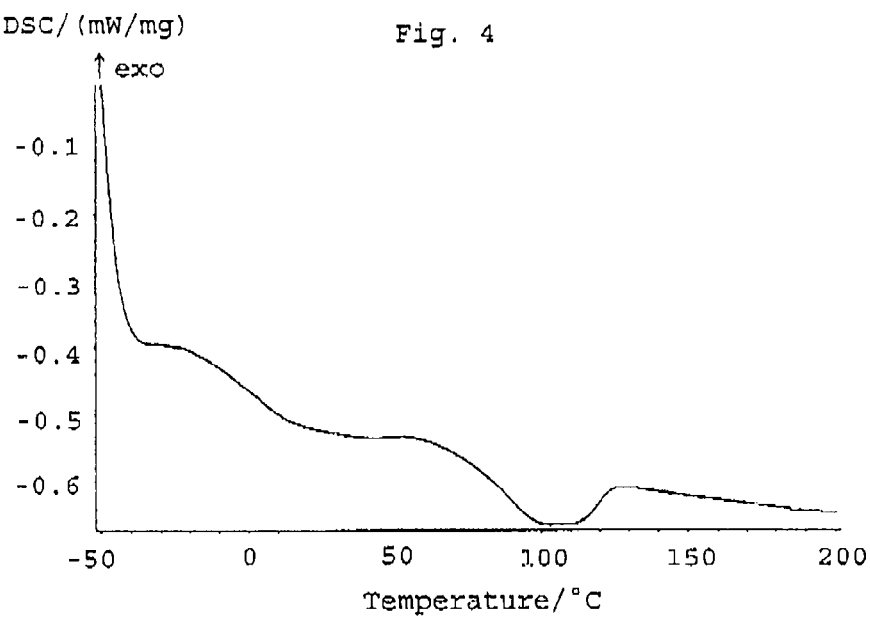
Fig. 4 polymer particles of Comparative Example 6 (a mixture of polymer A and polymer B)

BINDER COMPOSITION FOR POSITIVE ELECTRODES

TECHNICAL FIELD

The present invention relates to a binder composition for positive electrodes.

The above binder composition comprises specific polymer alloy particles, is excellent in all of ion conductivity, oxidation resistance and adhesion and is suitable for use as a binder material for the positive electrode of an electric storage device.

BACKGROUND ART

An electric storage device having a high voltage and a high energy density has been required as a power source for driving an electronic device. Especially lithium ion batteries and lithium ion capacitors are expected as electric storage devices having a high voltage and a high energy density.

An electrode used in these electric storage devices is generally manufactured by applying a mixture of active material particles and polymer particles which function as an electrode binder to the surface of a current collector and drying it. Characteristic properties required for the polymer particles used in an electrode include bonding ability between active material particles, integrity with the active material particles and the current collector, abrasion resistance in the step of winding the electrode and powder drop resistance that fine particles of the active material do not drop from a composition layer for electrodes (to be simply referred to as "active material layer" hereinafter) by cutting after the above step. When the polymer particles satisfy the above requirements, the method of folding the obtained electrode and the design of the structure of an electric storage device such as the setting of a winding radius have a high degree of freedom, thereby making it possible to reduce the size of the device. It has been empirically found that the above bonding ability between active material particles, integrity with the active material particles and the current collector and powder drop resistance are almost proportional to one another. Therefore, these properties may be collectively represented by the term "adhesion" hereinafter in this text.

It is advantageous that a fluorine-containing organic polymer having excellent ion conductivity and oxidation resistance, such as polyvinylidene difluoride (PVDF), should be used as an electrode binder. However, since an organic polymer containing a fluorine atom is generally interior in adhesion, the obtained electrode has problems with mechanical strength and durability. Then, technologies for improving adhesion while retaining the ion conductivity and oxidation resistance of an organic polymer have been investigated and proposed.

For example, Patent Document 1 (JP-A 2011-3529) proposes a technology for obtaining the lithium ion conductivity and oxidation resistance as well as adhesion of a binder for negative electrodes by using both PVDF and a rubber-based polymer. Patent Document 2 (JP-A 2010-55847) proposes a technology for improving adhesion through the step of removing a solvent at a low temperature after PVDF is dissolved in a specific organic solvent and the resulting solution is applied to the surface of a current collector. Further, Patent Document 3 (JP-A 2002-42819) proposes a technology for improving adhesion by using an electrode binder having a side chain with a fluorine atom in the main chain composed of a vinylidene fluoride copolymer.

DISCLOSURE OF THE INVENTION

However, according to the technology of Patent Document 1 in which the fluorine-containing organic polymer and the rubber-based polymer are used in combination, although adhesion is improved, the ion conductivity of the organic polymer is diminished and the oxidation resistance is greatly impaired. Therefore, an electric storage device manufactured by using this has a problem that charge-discharge characteristics are irreversibly deteriorated by repetitions of charge and discharge. Meanwhile, according to the technologies of Patent Documents 2 and 3 in which only the fluorine-containing organic polymer is used as an electrode binder, the level of adhesion is still unsatisfactory.

Thus, in the prior art, an electrode binder material which is excellent in ion conductivity and oxidation resistance as well as adhesion is unknown. Particularly when a binder comprising an organic polymer is used in a positive electrode, high oxidation resistance which can withstand the oxidation of a positive electrode reaction is required. Therefore, a binder material for positive electrodes all of ion conductivity, oxidation resistance and adhesion of which reach practical levels is not known yet.

An object of the present invention which has been made in view of this situation is to provide a binder material for positive electrodes which is excellent in all of ion conductivity, oxidation resistance and adhesion.

The above object and advantage of the present invention are attained by a binder composition for the positive electrode of an electric storage device, comprising:

polymer alloy particles composed of a polymer A having a recurring unit derived from at least one selected from the group consisting of vinylidene fluoride, ethylene tetrafluoride and propylene hexafluoride and a polymer B having a recurring unit derived from an unsaturated carboxylic acid ester; and water, wherein the average particle diameter of the polymer alloy particles is 50 to 400 nm, the polymer alloy particles are synthesized by absorbing a monomer for constituting the polymer B to the polymer A and polymerizing the monomer for constituting the polymer B to synthesize the polymer B, and the monomer for constituting the polymer B is an unsaturated carboxylic acid ester, or a mixture of an unsaturated carboxylic acid ester, and at least one monomer selected from the group consisting of an α, p-unsaturated nitrile compound, an unsaturated carboxylic acid, a conjugated diene compound, styrene, α-methylstyrene, p-methylstyrene, vinyltoluene, chlorostyrene, divinylbenzene, a carboxylic vinyl ester and an acid anhydride of an ethylenically unsaturated dicarboxylic acid.

In this text, the term "particle" refers to a granular particle having at least nanometer-order particle size and does not include a molecular-sized fine particle such as a solute dissolved in a solvent.

BRIEF DESCRIPTION OF THE DRAWINGS

FIG. 1 is a DSC chart of polymer particles obtained in Example 3;

FIG. 2 is a DSC chart of polymer particles obtained in Comparative Example 4;

FIG. 3 is a DSC chart of polymer particles obtained in Comparative Example 5; and FIG. 4 is a DSC chart of polymer particles obtained in Comparative Example 6.

BEST MODE FOR CARRYING OUT THE INVENTION

A preferred embodiment of the present invention will be described in detail hereinunder. It should be understood that the present invention is not limited to the following embodiment and that various changes and modifications may be made in the invention without departing from the spirit and scope thereof.

1. Binder Composition for Positive Electrodes

As described above, the binder composition for positive electrodes of the present invention comprises polymer alloy particles composed of a polymer A having a recurring unit derived from at least one selected from the group consisting of vinylidene fluoride, ethylene tetrafluoride and propylene hexafluoride and a polymer B having a recurring unit derived from an unsaturated carboxylic acid ester; and water, wherein the average particle diameter of the polymer alloy particles is 50 to 400 nm.

1.1 Polymer Alloy Particles

The polymer alloy particles contained in the binder composition for positive electrodes of the present invention are composed of a polymer A having a recurring unit derived from at least one selected from the group consisting of vinylidene fluoride, ethylene tetrafluoride and propylene hexafluoride and a polymer B having a recurring unit derived from an unsaturated carboxylic acid ester.

The "polymer alloy" is a "collective term for multi-component polymers obtained by mixing or chemical bonding two or more polymer components" and "polymer blends obtained by physically mixing together different kinds of polymers, block and graft copolymers in which different kinds of polymer components are covalently bonded together, polymer complexes in which different kinds of polymers are associated with each other by intermolecular force, and IPN (Interpenetrating Polymer Network) in which different: kinds of polymers are entangled with one another" according to the definition of "the fifth edition of Iwanami Physical and Chemical Dictionary" published by Iwanami Shoten. However, the polymer alloy particles contained in the binder composition for positive electrodes of the present invention are particles composed of IPN out of "polymer alloys in which different kinds of polymer components are not covalently bonded to one another".

It is considered that the polymer A constituting the polymer alloy particles has excellent ion conductivity and that the hard segment of a crystalline resin agglomerates to provide a pseudo-crosslinking point such as C—H . . . F—C to the main chain. Therefore, when the polymer A is used alone as the binder resin, although its ion conductivity and oxidation resistance are satisfactory, its adhesion and flexibility are unsatisfactory with the result of low adhesion. Meanwhile, as the polymer B constituting the polymer alloy particles has excellent adhesion and flexibility but low oxidation resistance, when it is used alone in a positive electrode as the binder resin, it is oxidized and decomposed to be modified by repetitions of charge and discharge, thereby making it impossible to obtain excellent charge-discharge characteristics.

However, ion conductivity and oxidation resistance as well as adhesion can be obtained at the same time by using polymer alloy particles containing the polymer A and the polymer B, thereby making it possible to manufacture a positive electrode having excellent charge/discharge characteristics.

When the polymer alloy particles are composed of only the polymer A and the polymer B, oxidation resistance can be further improved.

When the polymer alloy particles are measured with a differential scanning calorimeter (DSC) in accordance with JIS K7121, they preferably have only one heat absorption peak at a temperature range of $-50$ to $250°$ C. The temperature of this heat absorption peak is more preferably $-30$ to $+30°$ C.

When the polymer A constituting the polymer alloy particles are existent alone, in general, it has a heat absorption peak (melting temperature) at $-50$ to $250°$ C. In general, the polymer B constituting the polymer alloy particles has a different heat absorption peak (glass transition temperature) from that of the polymer A. Therefore, when the polymer A and the polymer B contained in the particles are phase-separated like a core-shell structure, two heat absorption peaks should be seen at $-50$ to $250°$ C. However, when only one heat absorption peak is seen at $-50$ to $250°$ C., it can be presumed that the particles are polymer alloy particles.

Further, when the temperature of only one heat absorption peak of the polymer alloy particles is in the range of $-30$ to $+30°$ C., the particles can provide higher flexibility and adhesion to an active material layer, thereby making it possible to further improve adhesion advantageously.

The average particle diameter (Da) of the polymer alloy particles is in the range of 50 to 1100 nm, preferably 100 to 250 nm. When the average particle diameter of the polymer alloy particles falls within the above range, the polymer alloy particles can be fully adsorbed to the surfaces of the active material particles with the result that the polymer alloy particles can move along with the movement of the active material particles. As a result, it is possible to suppress the sole migration of either one of the two different types of particles and accordingly, the deterioration of electric characteristics can be prevented. When the average particle diameter of the polymer alloy particles falls below the above range, electric characteristics are deteriorated by the migration of the particles disadvantageously. When the average particle diameter of the polymer alloy particles exceeds the above range, the ratio of the surface area to the amount of the polymer alloy particles becomes low, thereby making it impossible to develop excellent binder characteristics. As a result, adhesion degrades disadvantageously.

The average particle diameter of the polymer alloy particles is measured with a particle size distribution meter employing a light scattering method as a measurement principle. Examples of the particle size distribution meter include Coulter LS230, LS100 and LS13 320 (of Beckman Coulter. Inc.) and FPAR-1000 (of Otsuka Electronics Co., Ltd.). These particle size distribution meters can evaluate not only the primary particles of the polymer alloy particles but also secondary particles formed by the agglomeration of the primary particles. Therefore, the particle size distribution measured by these particle size distribution meters can be used as an index for the dispersion state of the polymer alloy particles contained in a slurry for positive electrodes. The average particle diameter, of the polymer alloy particles can also be measured by a method of measuring a supernatant with the above particle size distribution meter after the slurry for positive electrodes is centrifuged to spin down active material particles.

1.1.1 Polymer A

The polymer alloy particles contained in the binder composition for electrodes of the present invention comprise polymer A having a recurring unit derived from at least one selected from vinylidene fluoride, ethylene tetrafluoride and propylene hexafluoride. It is generally considered that a fluorinated polymer component like the polymer A is excellent in ion conductivity and oxidation resistance and has often been used in a positive electrode. However, its adhesion is low. Therefore, in the prior art, studies have been made to improve the adhesion of the fluorinated polymer by means of various modifications. However, the precision control of polymer synthesis conditions is required in attempts to improve adhesion by introducing a functional group into the polymer chain, and it has been difficult to attain the object.

The present invention makes it possible to develop adhesion without deteriorating ion conductivity and oxidation resistance by using the polymer A together with the polymer B as polymer alloy particles.

The polymer A may have a recurring unit derived from another copolymerizable unsaturated monomer excluding vinylidene fluoride, ethylene tetrafluoride and propylene hexafluoride.

Examples of this unsaturated monomer include (meth) acrylic acid esters such as methyl (meth)acrylate, ethyl (meth)acrylate, n-propyl (meth)acrylate, i-propyl (meth) acrylate, n-butyl (meth)acrylate, i-butyl (meth)acrylate, n-amyl (meth)acrylate, i-amyl (meth)acrylate, hexyl (meth) acrylate, cyclohexyl (meth)acrylate, 2-ethylhexyl (meth) acrylate, n-octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate and ethylene di(meth)acrylate; aromatic vinyl compounds such as styrene, α-methylstyrene and divinylbenzene; vinyl esters of carboxylic acid such as vinyl acetate and vinyl propionate; halogenated olefins such as vinyl fluoride, vinyl chloride and vinylidene chloride; conjugated dienes such as butadiene, isoprene and chloroprene; and α-olefins such as ethylene and propylene. At least one selected from these can be used.

The term "(meth)acrylate" in this text is a concept including both "acrylate" and "methacrylate".

The content of the recurring unit derived from at least one selected from vinylidene fluoride, ethylene tetrafluoride and propylene hexafluoride in the polymer A is preferably not less than 80 wt %, more preferably not less than 90 wt %.

The content of the recurring unit derived from vinylidene fluoride in the polymer A is preferably 50 to 99 wt %, more preferably 80 to 98 wt %. The content of the recurring unit derived from ethylene tetrafluoride in the polymer A is preferably 1 to 50 wt %, more preferably 2 to 20 wt %. The content of the recurring unit derived from propylene hexafluoride in the polymer A is preferably 1 to 50 wt %, more preferably 2 to 20 wt %.

The polymer A can be easily manufactured by emulsion polymerizing at least one unsaturated monomer selected from the above vinylidene fluoride, ethylene tetrafluoride and propylene hexafluoride and optionally another unsaturated monomer, in accordance with a known method.

1.1.2 Polymer B

The polymer alloy particles contained in the binder composition for positive electrodes of the present invention comprise the polymer B having a recurring unit derived from an unsaturated carboxylic acid ester. It is generally considered that a component such as the polymer B has excellent adhesion but low ion conductivity and low oxidation resistance, and therefore the polymer B has not been used in a positive electrode. However, the present invention has succeeded in developing satisfactory ion conductivity and oxidation resistance while retaining excellent adhesion by using a combination of the polymer B and the polymer A as polymer alloy particles.

The unsaturated carboxylic acid ester deriving the recurring unit constituting the polymer B is preferably a (meth) acrylic acid ester.

Examples of the (meth)acrylic acid ester include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-octyl (meth)acrylate, nonyl (meth) acrylate, decyl (meth)acrylate, hydroxymethyl (meth) acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa (meth)acrylate, allyl (meth)acrylate and ethylene di(meth)acrylate. At least one selected from these may be used. At least one selected from methyl (meth)acrylate, ethyl (meth)acrylate and 2-ethylhexyl (meth)acrylate out of these is preferred, and methyl (meth)acrylate is particularly preferred.

The polymer B may be a polymer having only a recurring unit derived from an unsaturated carboxylic acid ester and may have a constituent unit derived from another copolymerizable unsaturated monomer in addition to the recurring unit derived from an unsaturated carboxylic acid ester.

The content of the recurring unit derived from an unsaturated carboxylic acid ester in the polymer B is preferably not less than 65 wt %, more preferably not less than 75 wt % based on the total weight of the polymer B.

The above unsaturated monomer is selected from an α,β-unsaturated nitrile compound, an unsaturated carboxylic acid, a conjugated diene compound, an aromatic vinyl compound and other unsaturated monomers.

1.1.2.1 Constituent Unit Derived from α,β-Unsaturated Nitrile Compound

When the polymer B has a recurring unit derived from an α,β-unsaturated nitrile compound, the swelling property with an electrolytic solution of the polymer alloy particles can be further improved. That is, the existence of a nitrile group makes it easy for a solvent to penetrate a mesh structure composed of a polymer chain to widen the interval between meshes, whereby a solvated lithium ion easily moves through this mesh structure. It is considered that the diffusivity of the lithium ion is thereby improved with the result that the resistance of the electrode drops, thereby making it possible to obtain excellent charge-discharge characteristics.

Examples of the α,β-unsaturated nitrile compound include acrylonitrile, methacrylonitrile, α-chloroacrylonitrile, α-ethylacrylonitrile and vinylidene cyanide. At least one selected from these may be used. At least one selected from acrylonitrile and methacrylonitrile out of these is preferred, and acrylonitrile is particularly preferred.

The content of the constituent unit derived from the α,β-unsaturated nitrile compound is preferably not more than 35 wt %, more preferably 10 to 25 wt % based on the total of all the constituent units.

1.1.2.2 Constituent Unit Derived from Unsaturated Carboxylic Acid

When the polymer B has a constituent unit derived from an unsaturated carboxylic acid, the stability of the slurry for positive electrodes comprising the binder composition for positive electrodes of the present invention is improved.

Examples of the unsaturated carboxylic acid include mono- and di-carboxylic acids (anhydrides) such as acrylic acid, methacrylic acid, crotonic acid, maleic acid, fumaric acid and itaconic acid. At least one selected from these may be used. At least one selected from acrylic acid, methacrylic acid and itaconic acid is particularly preferred.

The content of the recurring unit derived from the unsaturated carboxylic acid is preferably not more than 15 wt %, more preferably 0.3 to 10 wt % based on the total of all the constituent units.

1.1.2.3 Constituent Unit Derived from Conjugated Diene Compound

When the polymer B has a constituent unit derived from a conjugated diene compound, a binder composition for positive electrodes having excellent viscoelastic characteristic and high strength can be easily manufactured. That is, when a polymer having a constituent unit derived from a conjugated diene compound is used, polymer alloy particles having a low Tg and a crosslinked structure are obtained, and therefore the obtained binder easily functions as a binder having good balance between elongation and strength with the result that adhesion can be further improved.

Examples of the conjugated diene compound include 1,3-butadinee, 2-methyl-1,3-butadiene, 2,3-dimethyl-1,3-butadiene and 2-chloro-1,3-butadiene. At least one selected from these may be used. 1,3-butadiene is particularly preferred as the conjugated diene compound.

The content of the constituent unit derived from the conjugated diene compound is preferably not more than 35 wt %, more preferably not more than 25 wt % based on the total of all the constituent units.

1.1.2.4 Constituent Unit Derived from Aromatic Vinyl Compound

When the polymer B has a constituent unit derived from an aromatic vinyl compound and the slurry for positive electrodes contains a conductivity providing agent, affinity for this agent can be further improved.

Examples of the aromatic vinyl compound include styrene, α-methylstyrene, p-methylstyrene, vinyltoluene, chlorostyrene and divinylbenzene. At least one selected from these may be used. Styrene is particularly preferred as the aromatic vinyl compound.

The content of the constituent unit derived from the aromatic vinyl compound is preferably not more than 35 wt %, more preferably not more than 25 wt % based on the total of all the constituent units.

1.1.2.5 Constituent Unit Derived from Another Copolymerizable Monomer

Examples of the other copolymerizable monomer deriving a constituent unit of the polymer B include carboxylic vinyl esters such as vinyl acetate and vinyl propionate; and acid anhydrides of an ethylenically unsaturated dicarboxylic acid. At least one selected from these may be used.

1.2 Preparation of Polymer Alloy Particles

The polymer alloy particles contained in the binder composition for positive electrodes of the present invention can be easily synthesized by known emulsion polymerization processes or combining them suitably.

The polymer alloy particles can be easily manufactured by a method in which the polymer A having a recurring unit derived from at least one selected from the group consisting of vinylidene fluoride, ethylene tetrafluoride and propylene hexafluoride is first synthesized by a known method, monomers for constituting the polymer B is added to the polymer A, the monomers are fully absorbed into the mesh structure of the polymer particles composed of the polymer A, and the absorbed monomers are polymerized in the mesh structure of the polymer A to synthesize the polymer B. To manufacture the polymer alloy particles by this method, it is essential that the monomers of the polymer B should be fully absorbed into the polymer A. When the absorption temperature is too low or the absorption time is too short, mere core-shell particles or particles having an IPN type structure in only part of the surface layer are obtained, and the polymer alloy particles of the present invention cannot be obtained in many cases. When the absorption temperature is too high, the pressure of the polymerization system becomes too high, which is disadvantageous from the viewpoints of the handling of the reaction system and reaction control. By excessively prolonging the absorption time, a more advantageous result is not obtained.

From the above viewpoint, the absorption temperature is preferably 30 to 100° C., more preferably 40 to 80° C.; and the absorption time is preferably 1 to 12 hours, more preferably 2 to 8 hours. When the absorption temperature is low, the absorption time is preferably prolonged and when the absorption temperature is high, a short absorption time suffices. Conditions that ensure that the value obtained by multiplying the absorption temperature (° C.) by the absorption time (hours) is about 120 to 300 (° C.·h), preferably 150 to 250 (° C.·h) are suitable.

The operation of absorbing the monomers of the polymer B into the mesh structure of the polymer A is preferably carried out in a known solvent used for emulsion polymerization, for example, water.

The content of the polymer A in the polymer alloy particles is preferably 3 to 60 wt %, more preferably 5 to 55 wt %, much more preferably 10 to 50 wt %, particularly preferably 20 to 40 wt % based on 100 wt % of the polymer alloy particles. When the polymer A is contained in the polymer alloy particles in the above range, balance between ion conductivity/oxidation resistance and adhesion becomes better.

The manufacture of the polymer alloy particles of the present invention, that is, the polymerization of the polymer A, the polymerization of the polymer B which is carried out after the monomers are absorbed into the obtained polymer A, or both of them may be carried out in the presence of a known emulsifier (surfactant), a polymerization initiator and a molecular weight control agent.

Examples of the above emulsifier include anionic surfactants such as sulfuric acid ester salts of a higher alcohol, alkylbenzene sulfonic acid salts, alkyldiphenyl ether disulfonic acid salts, aliphatic sulfonic acid salts, aliphatic carboxylic acid salts, dehydroabientic acid salts, naphthalenesulfonic acid formalin condensates and sulfuric acid ester salts of a nonionic surfactant; nonionic surfactants such as alkyl esters of polyethylene glycol, alkyl phenyl ethers of polyethylene glycol and alkyl ethers of polyethylene glycol; and fluorine-based surfactants such as perfluorobutyl sulfonic acid salts, perfluoroalkyl group-containing phosphoric acid esters, perfluoroalkyl group-containing carboxylic acid salts and perfluoroalkyl ethylene oxide adducts. At least one selected from these may be used.

The above polymerization initiator is suitably selected from water-soluble polymerization initiators such as lithium persulfate, potassium persulfate, sodium persulfate and ammonium persulfate; and oil-soluble polymerization initiators such as cumene hydroperoxide, benzoyl peroxide, t-butyl hydroperoxide, acetyl peroxide, diisopropylbenzene hydroperoxide, 1,1,3,3-tetramethylbutyl hydroperoxide, azobisisobutyronitrile and 1,1'-azobis(cyclohexanecarbonitrile). Out of these, potassium persulfate, sodium persulfate, cumene hydroperoxide or t-butyl hydroperoxide is particularly preferred. The amount of the polymerization initiator is not particularly limited but is suitably set in consideration of the composition of the monomer, pH of the polymerization reaction system and a combination with other additives.

Examples of the above molecular weight control agent include alkyl mercaptans such as n-hexyl mercaptan, n-octyl mercaptan, t-octyl mercaptan, n-dodecyl mercaptan, t-dodecyl mercaptan and n-stearyl mercaptan; xanthogen compounds such as dimethylxanthogen disulfide and diisopropylxanthogen disulfide; thiuram compounds such as terpinolene, tetramethylthiuram disulfide, tetraethylthiuram disulfide and tetramethylthiuram monosulfide; phenol compounds such as 2,6-di-t-butyl-4-methylphenol and styrenated phenol; allyl compounds such as allyl alcohol; halogenated hydrocarbon compounds such as dichloromethane, dibromomethane and carbon tetrabromide; vinyl ether compounds such as α-benzyloxystyrene, α-benzyloxyacrylonitrile and α-benzyloxyacrylamide; and triphenylethane, pentaphenylethane, acrolein, methacrolein, thioglycolic acid, thiomalic acid, 2-ethylhexyl thioglycolate and α-methylstyrene dimer. At least one selected from these may be used.

1.3 Binder Composition for Positive Electrodes

The binder composition for positive electrodes of the present invention comprises the above polymer alloy particles. Preferably, it is a latex containing the above polymer alloy particles in an aqueous medium in an emulsified state.

As the latex, a polymerization reaction mixture obtained after the polymer alloy particles are synthesized (polymerized) and preferably a reaction is terminated is directly used as the binder composition for positive electrodes of the present invention after its liquid property is adjusted as required Therefore, the binder composition for positive electrodes of the present invention may contain other components such as an emulsifier, a polymerization initiator or its residue, a surfactant and a neutralizer in addition to the above polymer alloy particles. The total content of the other components is preferably not more than 3 wt %, more preferably not more than 2 wt % based on the solid content weight of the composition.

The solid content concentration of the binder composition for positive electrodes of the present invention (the ratio of the total weight of components other than the aqueous medium in the composition to the total weight of the composition) is preferably 30 to 50 wt %, more preferably 35 to 45 wt %.

The pH of the binder composition for positive electrodes is preferably around neutral, more preferably a pH of 6.0 to 8.5, particularly preferably a pH of 7.0 to 8.0. To adjust the pH of the composition, a known water-soluble acid or base may be used. Examples of the acid include hydrochloric acid, nitric acid, sulfuric acid and phosphoric acid; and examples of the base include sodium hydroxide, potassium hydroxide, lithium hydroxide and ammonia water.

2. Slurry for Positive Electrodes

A slurry for positive electrodes can be manufactured by using the binder composition for positive electrodes of the present invention.

The slurry for positive electrodes is a dispersion liquid used to form an active material layer on a current collector by applying it to the surface of the current collector and drying it. The slurry contains at least the above polymer alloy particles, active material particles and water and preferably further contains a conductivity providing agent.

2.1 Characteristics of Slurry for Positive Electrodes

The ratio (Da/Db) of the average particle diameter (Da) of the polymer alloy particles to the average particle diameter (Db) of the active material particles contained in the slurry for positive electrodes manufactured by using the binder composition for positive electrodes of the present invention is in the range of preferably 0.01 to 1.0, more preferably 0.05 to 0.5. The technical meaning of this is as follows.

The slurry for positive electrodes contains water as a dispersion medium. In the step of drying the formed coating film after this slurry for positive electrodes is applied to the surface of the current collector, the migration of at least one from the polymer alloy particles and the active material particles is confirmed. That is, the particles move in the thickness direction of the coating film when they are received by the function of surface tension. Stated more specifically, at least one from the polymer alloy particles and the active material particles move toward a side opposite to the side in contact with the current collector of the coating film, that is, a gas-solid interface side where water evaporates. When this migration occurs, the distribution of the polymer alloy particles and the active material particles becomes nonuniform in the thickness direction of the coating film, thereby deteriorating the characteristics of the positive electrode and impairing adhesion. For example, when the polymer alloy particles which function as a binder bleeds toward the gas-solid interface side of the active material layer and the amount of the polymer alloy particles at the interface between the current collector and the active material layer becomes relatively small, the infiltration into the active material layer of the electrolytic solution is impeded, whereby satisfactory electric characteristics are not obtained and adhesion between the current collector and the active material layer becomes unsatisfactory, resulting in peel-off. Further, the polymer alloy particles bleed, thereby impairing the surface smoothness of the active material layer.

However, when the ratio (Da/Db) of the average particle diameters of the both particles falls within the above range, it is possible to suppress the occurrence of the above problem, and a positive electrode having excellent electric characteristics and adhesion can be easily manufactured. When the ratio (Da/Db) falls below the above range, the difference in average particle diameter between the polymer alloy particles and the active material particles becomes small with the result that the contact area between the polymer alloy particles and the active material particles becomes small, whereby powder drop resistance may become unsatisfactory. When the ratio (Da/Db) exceeds the above range, the difference in average particle diameter between the polymer alloy particles and the active material particles becomes too large, whereby the adhesion force of the polymer alloy particles may become unsatisfactory and integrity with the current collector and the active material layer may become insufficient The above slurry for positive electrodes has a solid content concentration (the ratio of the total weight of components other than the solvent contained in the slurry to the total weight of the slurry) of preferably 20 to 80 wt %, more preferably 30 to 75 wt %.

The above slurry for positive electrodes has a stringiness of preferably 30 to 80%, more preferably 33 to 79%, much more preferably 35 to 78%. When the stringiness falls below the above range and the slurry for positive electrodes is applied to the current collector, leveling becomes unsatisfactory, whereby it may be difficult to obtain uniformity in the thickness of a positive electrode. When a positive electrode which is nonuniform in thickness is used, an in-plane distribution of a charge/discharge reaction occurs, thereby making it difficult to develop stable battery performance. When the stringiness exceeds the above range and the slurry for positive electrodes is applied to the current collector, dripping is apt to occur, whereby a positive electrode having stable quality is hardly obtained. When the stringiness falls within the above range, the occurrence of these problems can be suppressed, and a positive electrode having excellent electric characteristics and adhesion is easily manufactured.

The stringiness in this text is measured as follows.

First, a zahn cup having an opening with a diameter of 5.2 mm at the bottom (Zahn viscosity cup No. 5 manufactured by Taiyu Kizai Co., Ltd.) is prepared. While this opening is closed, 40 g of the slurry for positive electrodes is poured into the Zahn cup. Thereafter, when the opening is opened, the slurry for positive electrodes flows out from the opening. When the time when the opening is opened is represented by $T_0$, the time when the stringing of the slurry for positive electrodes ends is represented by $T_A$, and the time when the outflow of the slurry for positive electrodes ends is represented by $T_B$, the stringiness in this text can be obtained from the following mathematical expression (1).

$$\text{Stringinesss (\%)} = ((T_A - T_0)/(T_B - T_0)) \times 100 \quad (1)$$

A detailed description is subsequently given of each component other than the polymer alloy particles contained in the above slurry for positive electrodes.

2.2 Active Material Particles

The material constituting the active material particles contained in the slurry for positive electrodes is not particularly limited and a suitable material can be selected according to the type of an electric storage device of interest. However, the active material particles contained in the slurry for positive electrodes which is manufactured by using the binder composition for positive electrodes of the present invention are preferably a lithium atom-containing oxide, more preferably a lithium atom-containing oxide having an olivine structure.

The above lithium atom-containing oxide having an olivine structure is a compound represented by the following general formula (1) and having an olivine crystal structure.

$$Li_{1-x}M_x(XO_4) \quad (1)$$

(in the above formula (1), M is at least one metal ion selected from the group consisting of Mg, Ti, V, Nb, Ta, Cr, Mn, Fe, Co, Ni, Cu, Zn, Al, Ga, Ge and Sn; X is at least one selected from the group consisting of Si, S, P and V; x is a numeral which satisfies 0<x<1; and the total valence of the Li ion and the M ion is +3.)

The positive-electrode potential of the above lithium atom-containing oxide having an olivine structure differs according to the type of the metal element M. Therefore, the battery voltage can be set to any value by selecting the type of the metal element M. Typical examples of the lithium atom-containing oxide having an olivine structure include  $LiFePO_4$, $LiCoPO_4$ and $Li_{0.90}Ti_{0.05}Nb_{0.05}Fe_{0.30}CO_{0.30}Mn_{0.30}PO_4$. Since an iron compound as a raw material of $LiFePO_4$ out of these is easily acquired and inexpensive, $LiFePO_4$ is preferred. Since a compound having a Co ion, Ni ion or Mn ion substituted for the Fe ion contained in the above compound has the same crystal structure as the above compound, it has the same effect as a positive electrode active material.

The average particle diameter (Da) of the active material particles is selected to satisfy the above ratio (Da/Db), preferably 0.4 to 10 μm, more preferably 0.5 to 7 μm.

When the average particle diameter of the active material particles falls within the above range, the diffusion distance of lithium contained in the active material particles becomes short, thereby making it possible to reduce resistance produced by the removal and insertion of lithium at the time of charge and discharge with the result of further improved charge-discharge characteristics. Further, when the slurry for positive electrodes contains a conductivity providing agent which will be described hereinafter, as the average particle diameter of the active material particles falls within the above range, a sufficient contact area between the active material particles and the conductivity providing agent can be secured, thereby improving the electron conductivity of the positive electrode and further reducing the resistance of the positive electrode.

The average particle diameter (Db) of the active material particles is a particle diameter (D50) value that ensures that the cumulative frequency becomes 50 in terms of volume percentage, obtained by measuring a particle size distribution with a particle size distribution meter using a laser diffraction method as a measurement principle. Examples of the laser diffraction type particle size distribution meter include HORIBA LA-300 series and HORIBA LA-920 series (of Horiba, Ltd.). This particle size distribution meter evaluates not only the primary particles of the active material particles but also secondary particles which are formed by the agglomeration of the primary particles. Therefore, the average particle diameter (Db) obtained by means of this particle size distribution meter can be used as an index of the dispersion state of the active material particles contained in the slurry for positive electrodes.

The average particle diameter (Db) of the active material particles can also be measured by centrifuging the slurry for positive electrodes to spin down the active material particles, removing the supernatant and measuring the precipitated active material particles by the above method.

2.3 Water

The above slurry for positive electrodes further contains water. When the slurry contains water, the stability of the slurry for positive electrodes is improved and a positive electrode can be manufactured with high reproducibility. Since water has a higher evaporation rate than a high-boiling point solvent (such as N-methylpyrrolidone) which is generally used in the slurry for positive electrodes, the improvement of productivity by the reduction of the solvent removal time and the suppression of the migration of particles can be expected.

2.4 Other Components

The above slurry for positive electrodes may contain other components as required in addition to the above components. The other components include a conductivity providing agent, a non-aqueous medium and a thickener.

2.4.1 Conductivity Providing Agent

Examples of the above conductivity providing agent include carbon for lithium ion secondary batteries; cobalt oxide for the positive electrode of a nickel-hydrogen secondary battery; and nickel powders, cobalt oxide, titanium oxide and carbon for the negative electrode of the nickel-hydrogen secondary battery. Examples of the carbon for use in the both batteries include graphite, activated carbon, acetylene black, furnace black, graphite, carbon fibers and fullerene. Out of these, acetylene black or furnace black can be preferably used. The amount of the conductivity providing agent is preferably not more than 20 parts by weight, more preferably 1 to 15 parts by weight, particularly preferably 2 to 10 parts by weight based on 100 parts by weight of the active material particles.

2.4.2 Non-Aqueous Medium

The above slurry for positive electrodes may contain a non-aqueous medium having a standard boiling point of 80 to 350° C. from the viewpoint of improving its coatability. Examples of the non-aqueous medium include amide compounds such as N-methylpyrrolidone, dimethylformamide and N,N-dimethylacetamide; hydrocarbons such as toluene, xylene, n-dodecane and tetralin; alcohols such as 2-ethyl-1-hexanol, 1-nonanol and lauryl alcohol; ketones such as methyl ethyl ketone, cyclohexanone, phorone, acetophenone and isophorone; esters such as benzyl acetate, isopentyl butyrate, methyl lactate, ethyl lactate and butyl lactate; amine compounds such as o-toluidine, m-toluidine and p-toluidine; lactones such as γ-butyrolactone and δ-butyrolactone; and sulfoxide sulfone compounds such as dimethyl sulfoxide and sulfolane. At least one selected from these may be used. Out of these, N-methylpyrrolidone is preferably used from the viewpoints of the stability of the polymer alloy particles and workability at the time of applying the slurry for positive electrodes.

2.4.3 Thickener

The above slurry for positive electrodes may contain a thickener from the viewpoint of improving its coatability. Examples of the thickener include cellulose compounds such as carboxymethyl cellulose, methyl cellulose and hydroxypropyl cellulose; ammonium salts and alkali metal salts of the above cellulose compounds; polycarboxylic acids such as poly(meth)acrylic acid and modified poly(meth)acrylic acid; alkali metal salts of the above polycarboxylic acids; polyvinyl alcohol-based (co)polymers such as polyvinyl alcohol, modified polyvinyl alcohol and ethylene-vinyl alcohol copolymer; and water-soluble polymers such as saponified products of a copolymer of an unsaturated carboxylic acid such as (meth) acrylic acid, maleic acid or fumaric acid and a vinyl ester. Out of these, alkali metal salts of carboxymethyl cellulose and alkali metal salts of poly(meth)acrylic acid are particularly preferred as thickeners.

Commercially available products of these thickeners include CMC1120, CMC1150, CMC2200, CMC2280 and CMC2450 (of Daicel Chemical Industries, Ltd.) as alkali metal salts of carboxymethyl cellulose.

When the slurry for positive electrodes contains a thickener, the content of the thickener is preferably not more than 20 wt %, more preferably 0.1 to 15 wt %, much more preferably 0.5 to 10 wt % based on the total solids content of the slurry for positive electrodes.

2.5 Production Process of Slurry for Positive Electrodes

The above slurry for positive electrodes can be manufactured by mixing together the above polymer alloy particles, active material particles, water and optional additives. These substances can be mixed together by agitation with a known means such as stirrer, defoaming apparatus, bead mill or high-pressure homogenizer.

At least part of the process of preparing the slurry for positive electrodes (the operation of mixing together the components) is preferably carried out under reduced pressure. This can prevent the formation of air bubbles in the obtained positive electrode layer. The reduced pressure is preferably $5.0 \times 10^4$ to $5.0 \times 10^5$ Pa as absolute pressure.

As for mixing and agitation for the manufacture of the slurry for positive electrodes, a mixer capable of starring these components to such an extent that an agglomerate of the active material particles does not remain in the slurry as well as necessary and satisfactory dispersion conditions must be selected. The degree of dispersion can be measured with a particle gauge, and mixing and dispersion are preferably carried out to ensure that an agglomerate as large as at least 100 μm or more is gone. Examples of the mixer which meets this condition include ball mill, sand mill, pigment disperser, grinding machine, ultrasonic disperser, homogenizer, planetary mixer and Hobart mixer.

3. Positive Electrode

The positive electrode can be manufactured by applying the above slurry for positive electrodes to the surface of a suitable current collector such as metal foil to form a coating film and drying the coating film. In the positive electrode manufactured as described above, an active material layer containing the above polymer alloy particles, the active material particles and optional components added as required is integrated with the top of the current collector. The positive electrode having a layer formed from the above-described slurry for positive electrodes on the surface of the current collector has high integrity with the current collector and the active material layer and a high charge-discharge rate characteristic which is one of its electric characteristics. This positive electrode is suitable as the positive electrode of an electric storage device.

The current collector is not particularly limited if it is made of a conductive material. In a lithium ion secondary battery, a current collector made of a metal such as iron, copper, aluminum, nickel or stainless steel is used. Particularly when aluminum is used in the positive electrode and copper is used in the negative electrode, the effect of a positive electrode manufactured by using the slurry for positive electrode of the present invention is obtained most prominently. A punching metal, an expand metal, a metal net, a foamed metal, a net-like metal fiber sintered product or a metal plated resin sheet is used as the current collector in a nickel hydrogen secondary battery.

Although the shape and thickness of the current collector are not particularly limited, the current collector is preferably like a sheet having a thickness of about 0.001 to 0.5 mm.

The method of applying the slurry for positive electrodes to the current collector is not particularly limited. The slurry for positive electrodes may be applied by doctor blade coating, dip coating, reverse roll coating, direct roll coating, gravure coating, extrusion coating, immersion or brushing. Although the application quantity of the slurry for positive electrodes is not particular limited, the thickness of the active material layer formed after the liquid medium is removed is preferably 0.005 to 5 mm, more preferably 0.01 to 2 mm.

The method of drying the coating film after coating (the method of removing water and an optionally used non-aqueous medium (to be collectively referred to as "liquid medium" hereinafter)) is not particularly limited, and drying with warm air, hot air, low-humidity air; vacuum drying; or drying by the application of (far) infrared radiation or electron beam may be employed. The drying speed is suitably set from a range at which the active material layer is not cracked by the concentration of stress or the active material layer is not separated from the current collector so that the liquid medium can be removed as quickly as possible.

Further, the current collector after drying is preferably pressed to enhance the density of the active material layer. Pressing may be carried out with a metal press or roll press. The density of the active material layer after pressing is preferably $1.6 \times 2.4$ g/cm$^3$, more preferably 1.7 to 2.2 g/cm$^3$.

4. Electric Storage Device

An electric storage device can be manufactured by using the above positive electrode.

The electric storage device has the above positive electrode, contains an electrolytic solution and can be manufactured by using parts such as a separator in accordance with a commonly used method. As a more specific manufacturing method, a negative electrode and a positive electrode are assembled together with a separator therebetween, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electric storage devices in accordance with the types of a negative electrode active material and a positive electrode active material.

The electrolytic solution may be a solution containing an electrolyte dissolved in a suitable solvent.

As the above electrolyte may be used a conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $LiCF_3SO_3$, $LiCH_3SO_3$, $LiC_4F_9SO_3$, $Li(CF_3SO_2)_2N$ and lower fatty acid lithium carboxylate.

The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide.

The concentration of the electrolyte in the electrolytic solution is preferably 0.5 to 3.0 mole/L, more preferably 0.7 to 2.0 mole/L.

A conventionally known aqueous solution of potassium hydroxide having a concentration of 5 moles/L or higher may be used as the electrolyte solution for nickel hydrogen secondary batteries.

EXAMPLES

The following examples are provided for the purpose of further illustrating the present invention but are in no way to be taken as limiting.

"Parts" and "%" in the following examples and comparative examples are based on mass unless otherwise noted.

Example 1

Preparation of Binder Composition (1) Synthesis of Polymer A

After the inside of an autoclave having an inner volume of about 6 liters and equipped with an electromagnetic stirrer was fully substituted by nitrogen, 2.5 liters of deoxidized pure water and 25 g of ammonium perfluorodecanoate as an emulsifier were fed to the autoclave and heated at up to 60° C. under agitation at 350 rpm. Then, a mixed gas of 70% of vinylidene fluoride (VDF) and 30 t of propylene hexafluoride (HFP) as monomers was fed to the autoclave until the inner pressure reached 20 kg/cm². 25 g of a Freon 113 solution containing 20% of diisopropyl peroxydicarbonate as a polymerization initiator was injected into the autoclave by using a nitrogen gas to start polymerization. A mixed gas of 60.2% of VDF and 39.8% of HFP was injected into the autoclave to keep the inside pressure at 20 kg/cm² during polymerization so as to maintain the pressure at 20 kg/cm². Since the polymerization rate dropped as the polymerization proceeded, after the passage of 3 hours, the same amount of the same polymerization initiator solution as above was injected into the autoclave by using the nitrogen gas to continue the reaction for another 3 hours. Thereafter, the reaction solution was cooled and agitation was stopped at the same time, unreacted monomers were discharged, and the reaction was terminated to obtain an aqueous dispersion containing 40% of polymer A fine particles.

When the obtained polymer was analyzed by $^{19}F$-NMR, the mass ratio of VDF to HFP was 21/4.

(2) Synthesis of Polymer Alloy Particles (Polymerization of Polymer B)

After the inside of a separable flask having a volume of 7 liters was fully substituted by nitrogen, 1,600 g (corresponding to 25 parts of the polymer A) of the aqueous dispersion containing polymer A fine particles obtained in (1), 0.5 part of ADEKA REASOAP SR1025 (trade name, manufactured by ADEKA Corporation), 30 parts of methyl methacrylate (MMA), 40 parts of 2-ethylhexyl acrylate (EHA), 5 parts of methacrylic acid (MAA) and 130 parts of water were fed to the separable flask sequentially and stirred at 70° C. for 3 hours so as to absorb the monomers into the polymer A. Then, 20 mL of a tetrahydrofuran solution containing 0.5 part of azobisisobutyronitrile which is an oil-soluble polymerization initiator was added and heated at 75° C. to carry out a reaction for 3 hours and further at 85° C. for 2 hours. After the reaction solution was cooled, the reaction was terminated, and the pH of the reaction solution was adjusted to 7 with a 2.5 N sodium hydroxide aqueous solution so as to obtain an aqueous dispersion (binder composition) containing 40% of polymer particles.

When the particle size distribution of the obtained aqueous dispersion was measured by using a particle size distribution meter employing a dynamic light scattering method as a measurement principle (FPAR-100 of Otsuka Electronics Co., Ltd.) to obtain its modal particle diameter from the particle size distribution, the number average particle diameter was 330 nm.

About 10 g of the obtained aqueous dispersion was fed to a Teflon Petri dish having a diameter of 8 cm and dried at 120° C. for 1 hour to form a film. 1 g of the obtained film (polymer) was weighed accurately, collected, immersed in 400 mL of tetrahydrofuran (THF) and shaken at 50° C. for 3 hours. When the THF-insoluble content was obtained from a measurement value of the weight (Y (g)) of the residue obtained by evaporating and removing THF as dissolution matter based on the following equation (2) after the THF phase was filtered with a 300-mesh metal net to separate the insoluble matter, the THF-insoluble content Of the above polymer particles was 85%.

$$\text{THF-insoluble content (\%)} = \{(1-Y)/1\} \times 100 \qquad (2)$$

Further, when the obtained fine particles were measured with a differential, scanning calorimeter (DSC), no melting temperature Tm was seen and a single glass transition temperature Tg was seen at –2° C. Therefore, it is considered that the obtained polymer particles were polymer alloy particles.

Preparation of Active Material Particles

Commercially available iron lithium phosphate ($LiFePO_4$) was ground with an agate mortar, and the obtained particles were classified with a sieve to obtain active material particles having a particle diameter (D50 value) of 0.5 μm.

Preparation of Slurry for Positive Electrodes 1 part (in terms of solids content) of a thickener (CMC1120 of Daicel Chemical Industries, Ltd.), 100 parts of the active material particles prepared in the above "preparation of active material particles", 5 parts of acetylene black and 68 parts of water were injected into a double-screw planetary mixer (TK Hivis Mix 2P-03 of Primix Corporation) and stirred at 60 rpm for 1 hour. Then, the binder composition prepared in the above "preparation of binder composition" was added to ensure that the amount of the polymer particles contained in the composition became a value shown in Table 1 and further stirred to obtain paste. Water was added to the obtained paste to adjust the solids content to 50%, and the resulting solution was stirred and mixed by means of a stirring defoaming device (Thinky Mixer of Thinky Corporation) at 200 rpm for 2 minutes, at 1,800 rpm for 5 minutes and further at 1,800 rpm for 1.5 minutes under vacuum (about $5.0 \times 10^3$ Pa) to prepare a slurry for positive electrodes.

—Measurement of Stringiness of Slurry for Positive Electrodes—

The stringiness of this slurry for positive electrode was measured as follows.

A Zahn cup having a 5.2 mm-diameter opening at the bottom of this container (Zahn viscosity cup No. 5 manufactured by Taiyu Kizai Co., Ltd.) was prepared. While the opening of this Zahn cup was closed, 40 g of the slurry for positive electrodes prepared above was poured into the cup. When the opening was opened, the slurry flowed out from the cup. At this point, the time when the opening was opened was represented by $T_0$ and the time during which the slurry kept stringing when it flowed out from the cup was measured visually and represented by $T_A$. Further, measurement was continued after the slurry did not string and the time $T_B$ when the slurry for positive electrodes did not flow out was measured. The stringiness of the slurry was obtained by inserting the measured values $T_0$, $T_A$ and $T_0$ into the above mathematical expression (1).

Manufacture and Evaluation of Positive Electrode and Electric Storage Device (1) Manufacture of Positive Electrode The slurry for positive electrodes prepared above was uniformly applied to the surface of a current collector composed of aluminum foil with a doctor blade to ensure that the film thickness after drying became 100 μm and dried at 120° C. for 20 minutes. Thereafter, the coating film was pressed with a roll press to ensure that the density of the film (active material layer) became a value shown in Table 1 so as to obtain a positive electrode.

(2) Evaluation of Cracking Ratio of Positive Electrode

This positive electrode was cut into a polar plate having a width of 2 cm and a length of 10 cm, and a repeated folding test was carried out by folding the positive electrode plate along a 2 mm-diameter round bar in the width direction 100 times. The size of each crack formed along the round bar was observed and measured visually to obtain the cracking ratio. The cracking ratio is defined by the following equation (3).

Cracking ratio (%)={cracking length (mm)÷length of whole polar plate (mm)}×100     (3)

An electrode plate having excellent flexibility and adhesion has a low cracking ratio. Although the cracking ratio is desirably 0%, when polar plates are produced by winding a positive electrode plate and a negative electrode plate spirally with a separator therebetween, a cracking ratio of up to 20% is allowed. However, when the cracking ratio is higher than 20%, the positive electrode plate is readily broken and it is impossible to manufacture polar plates, thereby reducing the productivity of the polar plates. Therefore, it is considered that the threshold value of the cracking ratio is 20%.

The measurement results of the cracking ratio are shown in Table 1.

(3) Manufacture of Negative Electrode 4 parts (in terms of solids content) of vinylidene polyfluoride (PVDF), 100 parts (in terms of solids content) of graphite as a negative electrode active material and 80 parts of N-methylpyrrolidone (NMP) were injected into a double-screw planetary mixer (TK Hivis Mix 2P-03 of Primix Corporation) and stirred at 60 rpm for 1 hour. Thereafter, 20 parts of NMP was injected into the mixer and stirred with a stirring defoaming device (Thinky mixer of Thinky Corporation) at 200 rpm for 2 minutes, at 1,800 rpm for 5 minutes and further at 1,800 rpm for 1.5 minutes under vacuum to prepare a slurry for negative electrodes.

The slurry for negative electrodes prepared above was uniformly applied to the surface of a current collector composed of copper foil with a doctor blade and dried at 120° C. for 20 minutes to ensure that the thickness of the coating film after drying became 150 μm. Thereafter, the coating film was pressed with a roll press to ensure that the density of the film became 1.5 g/cm$^3$ so as to obtain a negative electrode.

(4) Assembly of Lithium Ion Battery Cell

A molded product obtained by punching the negative electrode manufactured in "(2) manufacture of negative electrode" into a 16.16 mm-diameter piece in a glove box whose inside was substituted by Ar to ensure that its dew point became −80° C. or lower and molding it was placed on a bipolar coin cell (FS Flat Cell of Hohsen Corporation). Then, a separator (Celgard #2400 of Celgard Co., Ltd.) which was composed of a polypropylene porous film having a diameter of 24 mm was placed on the molded product, 500 μL of an electrolytic solution was injected such that air was not contained, a product obtained by punching the positive electrode manufactured in "(1) manufacture of positive electrode" into a 15.95 mm-diameter piece was placed on the separator, and the above bipolar coin cell was sealed up by closing the exterior body with screws to assemble a lithium ion battery cell (electric storage device).

The electrolytic solution used herein is a solution prepared by dissolving LiPF$_6$ in a mixed solvent of ethylene carbonate and ethyl methyl carbonate (weight ratio of 1/1) to a concentration of 1 mole/L.

(5) Evaluation of Electric Storage Device (Evaluation of Charge-Discharge Rate Characteristic)

The charge of the electric storage device manufactured above was started at a constant current (0.2 C), charge was continued at a constant voltage (4.2V) when the voltage became 4.2 V, and the charge capacity at 0.2 C was measured at the completion of charge (cut-off) when the current value became 0.01 C. Then, discharge was started at a constant current (0.2 C), and the discharge capacity at 0.2 C was measured at the completion of discharge (cut-off) when the voltage became 2.7V.

The charge of the same cell was started at a constant current (3 C), charge was continued at a constant voltage (4.2V) when the voltage became 4.2V, and the charge capacity at 3 C was measured at the completion of charge (cut-off) when the current value became 0.01 C. Then, discharge was started at a constant current (3 C), and the discharge capacity at 3 C was measured at the completion of discharge (cut-off) when the voltage became 2.7V.

By using the above measurement values, the ratio (percentage) of the charge capacity at 3 C to the charge capacity at 0.2 C was calculated to obtain the charge rate (%), and the ratio (percentage) of the discharge capacity at 3 C to the discharge capacity at 0.20 was calculated to obtain a discharge rate M.

When the charge rate and the discharge rate are both not less than 80%, it can be evaluated that the charge-discharge rate characteristic is excellent.

The measured charge rate and discharge rate values are shown in Table 1.

"1 C" as a measurement condition means a current value at which discharge completes in 1 hour when a cell having a certain electric capacity is discharged at a constant current.

For example, "0.1 C" means a current value at which discharge completes in 10 hours, and "10 C" means a current value at which discharge completes in 0.1 hour.

Examples 2 to 8 and Comparative Examples 1 and 2

Preparation of Binder Composition

An aqueous dispersion containing fine particles of the polymer A having composition shown in Table 1 was prepared in the same manner as in Example 1 except that the composition of the monomer gas and the amount of the emulsifier were suitably changed in "(1) synthesis of polymer A" in the above Example 1, and water was removed under reduced pressure or added according to the solid content concentration of the aqueous dispersion to obtain an aqueous dispersion having a solid content concentration of 40%.

Then, the above aqueous dispersion was used in an amount shown in Table 1 in terms of solids content, the amount (parts) of the monomer and the temperature and time for absorbing the monomer to the polymer A were changed as shown in Table 1, and the amount of the emulsifier was suitably changed in "(2) synthesis of polymer alloy particles" in Example 1 to obtain an aqueous dispersion (binder composition) containing polymer particles having a particle diameter shown in Table 1.

The results of the THF-insoluble content measurement and DSC measurement (glass transition temperature Tg, melting temperature Tm and whether the fine particles were polymer alloy particles or not) of the obtained fine particles are shown in Table 1.

Preparation of Active Material Particles

Active material particles having a particle diameter (D50 value) shown in Table 1 were prepared by suitably changing the opening of the sieve in use in "preparation of active material particles" in the above Example 1.

Preparation of Slurry for Positive Electrodes

A slurry for positive electrodes was prepared in the same manner as "preparation of slurry for positive electrode" in Example 1 except that the active material particles and the binder composition prepared above were used in amounts shown in Table 1 and the thickener of a type shown in Table 1 was used in an amount shown in Table 1 to measure its stringiness. The stringiness values are shown in Table 1.

Manufacture and Evaluation of Positive Electrode and Electric Storage Device

A positive electrode and an electric storage device were manufactured and evaluated in the same manner as in Example 1 except that the materials obtained above were used.

The evaluation results are shown in Table 1.

Comparative Example 3

Preparation of Binder Composition

An aqueous dispersion containing fine particles of a polymer A having composition shown in Table 1 was obtained in the same manner as in Example 1 except that the composition of the monomer gas was suitably changed in "(1) synthesis of polymer A" in the above Example 1.

Then, the above aqueous dispersion was used in an amount shown in Table 1 in terms of solids content, the amount of the monomer of the polymer (B) was changed as shown in Table 1, and the amount of the emulsifier was changed in "(2) synthesis of polymer alloy particle" in Example 1 so as obtain an aqueous dispersion containing polymer particles having a particle diameter of 400 nm shown in Table 1.

Further, solvent substitution was carried out by using N-methylpyrrolidone (NMP) as a solvent to obtain a binder composition. The polymer was dissolved in the solvent in this binder composition.

Preparation of Active Material Particles

Active material particles having a particle diameter (D50 value) of 1.0 μm were prepared by changing the opening of the sieve in use in "preparation of active material particles" in the above Example 1.

Preparation of Slurry for Positive Electrodes and Manufacture and Evaluation of Electric Storage Device 10 parts (solids content) of a thickener (CMC1150 of Daicel Chemical Industries, Ltd.), 100 parts of the active material particles prepared in the above "preparation of active material particles", 5 parts of acetylene black, 4 parts (in terms of solids content) of the binder composition prepared in the above "preparation of binder composition" and 68 parts of NMP were injected into a double-screw planetary mixer (TK Hivis mix 2P-03 of Primix Corporation) and stirred at 60 rpm for 2 hours to obtain a paste. NMP was added to the obtained paste to adjust its solids content to 45 and the resulting mixture was stirred and mixed by means of a stirring defoaming device (Thinky mixer of Thinky Corporation) at 200 rpm for 2 minutes, at 1,800 rpm for 5 minutes and further at 1,800 rpm for 1.5 minutes under vacuum to prepare a slurry for positive electrodes.

A positive electrode and an electric storage device were manufactured and evaluated in the same manner as "manufacture and evaluation of positive electrode and electric storage device" in Example 1 except that the above slurry for positive electrodes was used.

The evaluation results are shown in Table 1.

Comparative Example 4

Preparation of Binder Composition

An aqueous dispersion containing fine particles of the polymer A having composition shown in Table 1 was obtained in the same manner as in Example 1 except that the composition of the monomer gas was changed in "(1) synthesis of polymer A" in the above Example 1 and used as a binder composition ("(2) synthesis of polymer alloy particles" was not carried out after this).

Preparation of Slurry for Positive Electrodes and Manufacture and Evaluation of Positive Electrode and Electric Storage Device A slurry for positive electrodes was prepared and a positive electrode and an electric storage device were manufactured by using this and evaluated in the same manner as "preparation of slurry for positive electrodes" and "manufacture and evaluation of positive electrode and electric storage device" in Example 1 except that the binder composition prepared above was used and 10 parts (in terms of solids content) of CMC220 (of Daicel Chemical Industries, Ltd.) was used as a thickener.

The evaluation results are shown in Table 1.

Comparative Example 5

Preparation of Binder Composition

An aqueous dispersion containing polymer particles was obtained in the same manner as in Example 1 except that the aqueous dispersion containing the polymer A was not used, the amount of the ADEKA REASOAP SR1025 emulsifier, was changed to 1.0 part, the amount of water was changed to 145 parts and the amount (parts) of the monomer of the polymer (B) was changed as shown in Table 1 in "(2) synthesis of polymer alloy particles" in the above Example 1 and used as a binder composition.

Preparation of Slurry for Positive Electrodes and Manufacture and Evaluation of Positive Electrode and Electric Storage Device A slurry for positive electrodes was prepared and a positive electrode and an electric storage device were manufactured by using this and evaluated in the same manner as "preparation of slurry for positive electrodes" and "manufacture and evaluation of positive electrode and electric storage device" in Example 1 except that the binder composition prepared above was used and 10 parts (in terms of solids content) of CMC1120 (of Daicel Chemical Industries, Ltd.) was used as a thickener.

The evaluation results are shown in Table 1.

Comparative Example 6

Preparation of Binder Composition

An aqueous dispersion containing 40% of polymer particles (binder composition) was obtained in the same manner as in Example 1 except that 0.5 part of ADEKA REASOAP SR1025 (of ADEKA Corporation) as an emulsifier was added to 1,600 g (corresponding to 25 parts of the polymer A) of an aqueous dispersion containing fine particles of the polymer A, the temperature was raised to 75° C., 30 parts of methyl methacrylate (MMA), 40 parts of 2-ethylhexyl acrylate (EHA), 5 parts of methacrylic acid (MAA), 130 parts of water and 0.5 part of azobisisobutyronitrile were added at almost the same time to start polymerization and a reaction was carried out at 75° C. for 3 hours and then at 85° C. for 2 hours in "(2) synthesis of polymer alloy particles" in the above Example 1.

Preparation of Slurry for Positive Electrodes and Manufacture and Evaluation of Positive Electrode and Electric Storage Device A slurry for positive electrodes was prepared and a positive electrode and an electric storage device were manufactured by using this and evaluated in the same manner as "preparation of slurry for positive electrodes" and "manufacture and evaluation of positive electrode and electric storage device" in Example 1 except that the binder composition prepared above was used and 1 part (in terms of solids content) of CMC1120 (of Daicel Chemical Industries, Ltd.) was used as a thickener.

The evaluation results are shown in Table 1.

TABLE 1 production example and evaluation results

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Slurry for positive electrodes | Polymer particles | Polymer A | VDF (parts) | 21 | 20 | 24 | 20 | 4 | 20 | 40 | 21 |
| | | | HFP (parts) | 4 | 5 | 1 | — | 1 | 5 | 10 | 4 |
| | | | TFE (parts) | — | — | — | 5 | — | — | — | — |
| | | | Amount (parts) | 25 | 25 | 25 | 25 | 5 | 25 | 50 | 25 |
| | | Polymer B | MMA (parts) | 30 | 30 | 30 | 30 | 40 | 10 | 20 | 30 |
| | | | EHA (parts) | 40 | 40 | 40 | 40 | 50 | 40 | 25 | 40 |
| | | | AN (parts) | — | — | — | — | — | 20 | — | — |
| | | | AA (parts) | — | 5 | — | — | — | 5 | — | — |
| | | | MAA (parts) | 5 | — | 5 | 5 | 5 | — | 5 | 5 |
| | | Absorption conditions of monomer | Temperature (° C.) | 70 | 50 | 40 | 80 | 60 | 60 | 30 | 70 |
| | | | Time (h) | 3 | 5 | 6 | 2 | 4 | 4 | 8 | 3 |
| | | Particle diameter (nm) | | 330 | 210 | 330 | 330 | 390 | 200 | 160 | 60 |
| | | THF-insoluble content (wt %) | | 85 | 95 | 95 | 85 | 85 | 90 | 85 | 90 |
| | | DSC | Tg (° C.) | −5 | −5 | 1 | −2 | −10 | 0 | 5 | −5 |
| | | | Tm (° C.) | — | — | — | — | — | — | — | — |
| | | whether polymer alloy or not? | | ○ | ○ | ○ | ○ | ○ | ○ | ○ | ○ |
| | | Amount (parts) | | 1 | 2 | 0.5 | 5 | 1 | 1 | 1 | 1 |
| | Active material | Average particle diameter (D50) (μm) | | 0.5 | 10 | 3.0 | 6.8 | 1.0 | 1.4 | 0.5 | 0.5 |
| | | Amount (parts) | | 100 | 100 | 100 | 100 | 100 | 100 | 100 | 100 |
| | Thickener | Type | | CMC1120 | CMC2280 | CMC2200 | CMC1120 | CMC1150 | CMC1120 | CMC1150 | CMC1120 |
| | | Amount (parts) | | 1 | 4 | 3 | 7 | 0.1 | 10 | 4 | 2 |
| | | Solvent | | water | water | water | water | water | water | water | water |
| | | Stringiness (%) | | 65 | 43 | 50 | 75 | 32 | 73 | 60 | 65 |

TABLE 1-continued production example and evaluation results

| | | | | | | | | | |
|---|---|---|---|---|---|---|---|---|---|
| Positive electrode | Density of active material layer (g/cm³) | 1.6 | 1.8 | 2.4 | 1.8 | 1.7 | 2.2 | 1.9 | 2.1 |
| | Cracking ratio | 15 | 1 | 7 | 1 | 5 | 9 | 17 | 14 |
| Electric storage device | Charge rate (%) | 89 | 90 | 86 | 86 | 84 | 86 | 88 | 86 |
| | Discharge rate (%) | 87 | 88 | 84 | 85 | 81 | 83 | 87 | 84 |

| | | | | | C. Ex. 1 | C. Ex. 2 | C. Ex. 3 | C. Ex. 4 | C. Ex. 5 | C. Ex. 6 |
|---|---|---|---|---|---|---|---|---|---|---|
| Slurry for positive electrodes | Polymer particles | Polymer A | VDF (parts) | | 48 | 20 | 2 | 20 | — | 21 |
| | | | HFP (parts) | | 12 | 5 | 0.5 | 5 | — | 4 |
| | | | TFE (parts) | | — | — | — | — | — | — |
| | | | Amount (parts) | | 60 | 25 | 2.5 | 25 | 0 | 25 |
| | | Polymer B | MMA (parts) | | 15 | 50 | 42.5 | — | 30 | 30 |
| | | | EHA (parts) | | 20 | 20 | 50 | — | 40 | 40 |
| | | | AN (parts) | | — | — | — | — | — | — |
| | | | AA (parts) | | — | — | — | — | — | — |
| | | | MAA (parts) | | 5 | 5 | 5 | — | 5 | 5 |
| | | Absorption conditions of monomer | Temperature (° C.) | | 70 | 70 | 70 | — | — | — |
| | | | Time (h) | | 3 | 3 | 3 | — | — | — |
| | | Particle diameter (nm) | | | 40 | 410 | (dissolved) | 150 | 300 | 330 |
| | | THF-insoluble content (wt %) | | | 85 | 85 | 85 | 90 | 70 | 85 |
| | | DSC | Tg (° C.) | | −5 | 35 | −10 | — | −9 | −10 |
| | | | Tm (° C.) | | — | — | — | 115 | — | 105 |
| | | whether polymer alloy or not? | | | ○ | ○ | ○ | X | X | X |
| | | Amount (parts) | | | 1 | 4 | 4 | 4 | 4 | 1 |
| | Active material | Average particle diameter (D50) (μm) | | | 15 | 0.5 | 1.0 | 0.5 | 0.5 | 0.5 |
| | | Amount (parts) | | | 100 | 100 | 100 | 100 | 100 | 100 |
| | Thickener | Type | | | CM2280 | CMC1120 | CMC1150 | CMC2200 | CMC1120 | CMC1120 |
| | | Amount (parts) | | | 4 | 15 | 10 | 10 | 10 | 1 |
| | Solvent | | | | water | water | NMP | water | water | water |
| | Stringiness (%) | | | | 48 | 82 | 25 | 60 | 70 | 66 |
| Positive electrode | Density of active material layer (g/cm³) | | | | 1.4 | 1.8 | 1.9 | 1.8 | 1.7 | 1.6 |
| | Cracking ratio | | | | 23 | 25 | 45 | 43 | 6 | 10 |
| Electric storage device | Charge rate (%) | | | | 75 | 85 | 64 | 87 | 68 | 73 |
| | Discharge rate (%) | | | | 74 | 84 | 65 | 87 | 67 | 70 |

Ex.: Example
C. Ex.: Comparative Example
The symbols in Table 1 represent the following components.
[monomer of plymer A]
VDF: vinylidene fluoride
HFP: propylene hexafluoride
TFE: ethylene tetrafluoride
[monomer of polymer B]
MMA: methyl methacrylate
EHA: 2-ethylhexyl acrylate
AN: acrylonitrile
AA: acrylic acid
MAA: methacrylic acid
[solvent]
NMP: N-methylpyrrolidone
[whether polymer alloy or not]
○: polymer alloy
X: not polymer alloy
[thickener]
CMC1120, CMC1150, CMC2200, CMC2280 and CMC2450 are the trade names of products of Daicel Chemical Industries, Ltd. and thickeners composed of an alkali metal salt of carboxymethyl cellulose.
"—" in Table 1 means that the corresponding component is not used or the corresponding operation is not carried out.

As obvious from Table 1 above, the slurry for positive electrodes prepared by using each of the binder compositions of the present invention shown in Examples 1 to 8 has high integrity with the current collector and the active material layer and a low cracking ratio and provides a positive electrode having high adhesion. Electric storage devices (lithium ion battery) having these positive electrodes have excellent charge-discharge rate characteristic.

Meanwhile, an electric storage device showing excellent charge-discharge characteristics was not obtained from the binder composition of Comparative Example 1. A positive electrode having high adhesion was not obtained from the binder composition of Comparative Example 2. At least one of the adhesion of a positive electrode and the charge-discharge rate characteristic of an electric storage device obtained from the binder compositions of Comparative Examples 4 and 5 was unsatisfactory. A non-aqueous dispersion medium was used in Comparative Example 3, the polymer particles were dissolved and therefore, both the adhesion of a positive electrode and the charge-discharge rate characteristic of an electric storage device were unsatisfactory.

As described above, it was presumed from the DSC chart that the polymer particles in the present invention are polymer alloy particles.

DSC charts of polymer particles obtained in the above Example 3 and Comparative Examples 4, 5 and 6 are shown in FIGS. 1 to 4, respectively.

FIG. 2 is a DSC chart when only the polymer A was used, FIG. 3 is a DSC chart when only the polymer B was used, FIG. 4 is a DSC chart when a mixture of the polymer A and the polymer B was used, and FIG. 1 is a DSC chart of polymer alloy particles composed of the polymer A and the polymer B.

The melting temperature Tm of the polymer. A was seen in FIG. 2, and the glass transition temperature Tg of the polymer B was seen in FIG. 3.

Since both the melting temperature Tm of the polymer A and the glass transition temperature Tg of the polymer B were seen in FIG. 4 (when the monomer of the polymer B was not absorbed into the polymer A), the polymer particles were considered as a mixture of the polymer A and the polymer B. Since neither the melting temperature Tm of the polymer A nor the glass transition temperature Tg of the polymer B was seen and a single new glass transition temperature Tg which is different from Tm of the polymer A and Tg of the polymer B was seen in FIG. 1, the polymer particles were considered as polymer alloy particles.

The present invention is not limited to the above embodiment and can be modified in various ways. The present invention includes constitution which is substantially the same as the constitution described in the embodiment (for example, constitution which is the same in function, method and result, or constitution which is the same in object and effect). The present invention also includes constitution obtained by replacing a non-essential part of the constitution described in the above embodiment by another constitution. The present invention further includes constitution which provides the same function and effect as the constitution described in the above embodiment or constitution which can attain the same object. The present invention still further includes constitution obtained by adding prior art to the constitution described in the above embodiment.

EFFECT OF THE INVENTION

The binder composition for positive electrodes of the present invention has excellent ion conductivity and oxidation resistance and can provide a positive electrode having high adhesion.

An electric storage device comprising a positive electrode manufactured by using the binder composition for positive electrodes of the present invention has extremely excellent charge-discharge rate characteristic which is one of its electric characteristics.

The invention claimed is:
1. A binder composition comprising:
polymer alloy particles comprising (i) a polymer A having a recurring unit derived from at least one selected from the group consisting of vinylidene fluoride, ethylene tetrafluoride and propylene hexafluoride, and (ii) a polymer B having a recurring unit derived from an unsaturated carboxylic acid ester; and
water,
wherein:
the average particle diameter of the polymer alloy particles is 50 to 400 nm;
the polymer alloy particles are synthesized by absorbing a monomer for constituting the polymer B to the polymer A and polymerizing the monomer for constituting the polymer B to synthesize the polymer B;
the monomer for constituting the polymer B is an unsaturated carboxylic acid ester, or a mixture of an unsaturated carboxylic acid ester and at least one monomer selected from the group consisting of an α,β-unsaturated nitrile compound, an unsaturated carboxylic acid, a conjugated diene compound, styrene, α-methylstyrene, p-methylstyrene, vinyltoluene, chlorostyrene, divinylbenzene, a carboxylic vinyl ester and an acid anhydride of an ethylenically unsaturated dicarboxylic acid;
the polymer alloy particles comprise 1 to 60 wt % of the polymer A, based on the weight of the polymer alloy particles; the polymer alloy particles have only a single Tg or Tm in a temperature range of −50° C. to 250° C., based on a differential scanning calorimetry measurement performed in accordance with JIS K7121;
the polymer alloy particles are not core-shell particles; and
the binder composition is for use as a positive electrode of an electric storage device.
2. The binder composition of claim 1, wherein the single Tg or Tm is in a temperature range of −30 to +30° C.
3. A positive electrode comprising the binder composition of claim 1.
4. An electric storage device comprising the positive electrode of claim 3.
5. The binder composition of claim 1, wherein the average particle diameter of the polymer alloy particles is 100 to 250 nm.
6. The binder composition of claim 1, wherein the polymer A comprises at least 80 wt % of the recurring unit derived from at least one selected from the group consisting of vinylidene fluoride, ethylene tetrafluoride and propylene hexafluoride, based on the weight of the polymer A.
7. The binder composition of claim 1, wherein the polymer A comprises at least 90 wt % of the recurring unit derived from at least one selected from the group consisting of vinylidene fluoride, ethylene tetrafluoride and propylene hexafluoride, based on the weight of the polymer A.
8. The binder composition of claim 1, wherein the polymer A comprises 50 to 98 wt % of vinylidene fluoride and at least one selected from the group consisting of 1 to 50 wt % of ethylene tetrafluoride and 1 to 50 wt % of propylene hexafluoride, based on the weight of the polymer A.
9. The binder composition of claim 1, wherein the polymer A comprises 80 to 98 wt % of vinylidene fluoride and at least one selected from the group consisting of 1 to 20 wt % of ethylene tetrafluoride and 1 to 20 wt % of propylene hexafluoride, based on the weight of the polymer A.
10. The binder composition of claim 1, wherein the unsaturated carboxylic acid ester is a (meth)acrylic acid ester.
11. The binder composition of claim 1, wherein the polymer B comprises at least 65 wt % of the recurring unit derived from the unsaturated carboxylic acid ester, based on the weight of the polymer B.
12. The binder composition of claim 1, wherein the polymer B comprises at least 75 wt % of the recurring unit derived from the unsaturated carboxylic acid ester, based on the weight of the polymer B.

13. The binder composition of claim 1, wherein the polymer alloy particles comprise 10 to 50 wt % of the polymer A, based on the weight of the polymer alloy particles.

14. The binder composition of claim 1, wherein the polymer alloy particles comprise 20 to 40 wt % of the polymer A, based on the weight of the polymer alloy particles.

15. The binder composition of claim 1, wherein the monomer for constituting the polymer B comprises methyl (meth) acrylate and acrylonitrile.

16. The binder composition of claim 1, wherein the monomer for constituting the polymer B comprises methyl (meth) acrylate and at least one selected from the group consisting of acrylic acid, methacrylic acid and itaconic acid.

17. The binder composition of claim 1, wherein the monomer for constituting the polymer B comprises methyl (meth) acrylate and 1,3-butadiene.

18. The binder composition of claim 1, wherein the monomer for constituting the polymer B comprises methyl (meth) acrylate and styrene.

* * * * *